United States Patent [19]

Halwes

[11] 3,945,628
[45] Mar. 23, 1976

[54] NODAL BEAM INERTIAL FLEXURE

[75] Inventor: Dennis R. Halwes, Arlington, Tex.

[73] Assignee: Textron Inc., Providence, R.I.

[22] Filed: June 3, 1974

[21] Appl. No.: 475,824

Related U.S. Application Data

[62] Division of Ser. No. 428,235, Dec. 26, 1973, Pat. No. 3,858,831.

[52] U.S. Cl. .................. 267/152; 267/141; 188/1 B
[51] Int. Cl.² ............................................ F16F 3/10
[58] Field of Search ................... 267/152, 141, 140; 188/1 B; 244/17, 27

[56] References Cited
UNITED STATES PATENTS

| | | | |
|---|---|---|---|
| 3,330,519 | 7/1967 | Thorn | 267/141 |
| 3,460,628 | 8/1969 | Tankersley | 267/141 |
| 3,730,509 | 5/1973 | Jorn | 267/152 |
| 3,842,945 | 10/1974 | Potter | 188/1 B |

*Primary Examiner*—James B. Marbert
*Attorney, Agent, or Firm*—Richards, Harris & Medlock

[57] ABSTRACT

A helicopter having a lift unit including a multiblade helicopter main rotor system and a nodalized module including a beam driven in response to blade developed vertical forces has a fuselage unit connected to the beam only at vibration nodal points along the beam. The coupling between the lift unit and the fuselage comprises two rigid arms which form the beam and which extend toward one another from the nodal points. A multilayered flexible beam section interconnects the arms to accommodate beam bending in the flexible section. A rigid member is attached to each of the arms at drive points intermediate the nodal points in supporting relation from the lift unit.

7 Claims, 5 Drawing Figures

NODAL BEAM INERTIAL FLEXURE

This is a division of application Ser. No. 428,235, filed 12-26-73 now U.S. Pat. No. 3,858,831.

This invention relates to vibration isolation in helicopters, and more particularly to structure which provides isolation while providing operation in a focused rotor mode.

Vibration in helicopters is particularly severe in two-blade units. The vertical vibratory input through the pylon to the fuselage is produced by variations in the force on the rotating blades of the lift unit. Because of the intensity of the vibration, efforts have been made to attenuate or eliminate the undesired motion in the fuselage.

Copending application Ser. No. 331,614 filed Feb. 12, 1973 discloses a system wherein a lift unit is coupled to a load carrying fuselage only at vibration nodal points on the lift unit. The transmission of vibratory energy into the fuselage thus hung from the lift unit at nodal points is minimized or reduced drastically. The improvement in performance and comfort has been dramatic.

The present invention is directed to an improvement over the system described and claimed in said application. An objective is to provide for focused rotor operation while minimizing the weight and space requirements. Application Ser. No. 331,614 discloses the conditions under which vibration nodes may be located outside the segment of fuselage spanned by driving linkages. When so arranged, the space requirements for the system are reduced.

In accordance with the present invention, an improved system is provided for a helicopter which includes a multiblade main rotor system with a nodalized module including a beam driven in response to blade developed vertical forces. A fuselage is connected to the beam only at vibrational nodal points. The beam includes two rigid arms extending toward one another from the nodal points. A multilayered flexible beam section interconnects the arms to accommodate beam bending. A rigid member then attaches to each of the arms at drive points intermediate the nodal points in supporting relation from the lift unit.

Preferably the rigid members couple the lift unit to the fuselage in a focused rotor geometrical relationship.

For a more complete understanding of the present invention and for further objects and advantages thereof, reference may now be had to the following description taken in conjunction with accompanying drawings in which:

FIG. 1 diagrammatically illustrates a focused rotor nodalized lift module-fuselage relationship;

FIG. 1

Figure 1:
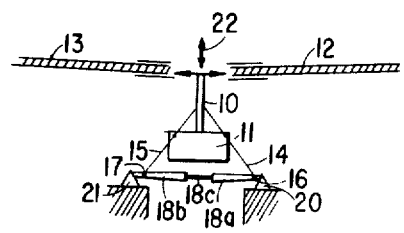

Referring now to FIG. 1, a helicopter pylon 10 extends upward from a drive transmission unit 11. A multiblade helicopter rotor is indicated by blade segments 12 and 13. The transmission 11 is coupled by links 14 and 15 to pin couplings 16 and 17 on a nodalizing beam 18. Beam 18 is connected by pins to fuselage fixtures 20 and 21. Beam 18 is made up of three major components. Two rigid arms 18a and 18b extend from fixtures 20 and 21. An intermediate element 18c is somewhat more resilient and is rigidly secured in elements 18a and 18b.

As the structure of FIG. 1 vibrates in response to forces represented by arrow 22, those forces are applied through pylon 10 to transmission 11 and thence through links 14 and 15 to the compound beam 18. Beam 18 is caused to vibrate with the center section undergoing cyclic beam bending. Properly constructed, beam 18 will vibrate in such a manner that the points at which the beam is coupled to fixtures 20 and 21 will be at vibrational nodes so that the motion represented by arrow 22 will not be imposed on the fuselage on which the fixtures 20 and 21 are mounted.

The present invention is particularly directed to the provision of a suitable beam structure and linkages associated with such beam structure that focused rotor operation is achieved and such that the torque may be applied from the rotor mounting to the fuselage.

FIG. 2

Figure 2:
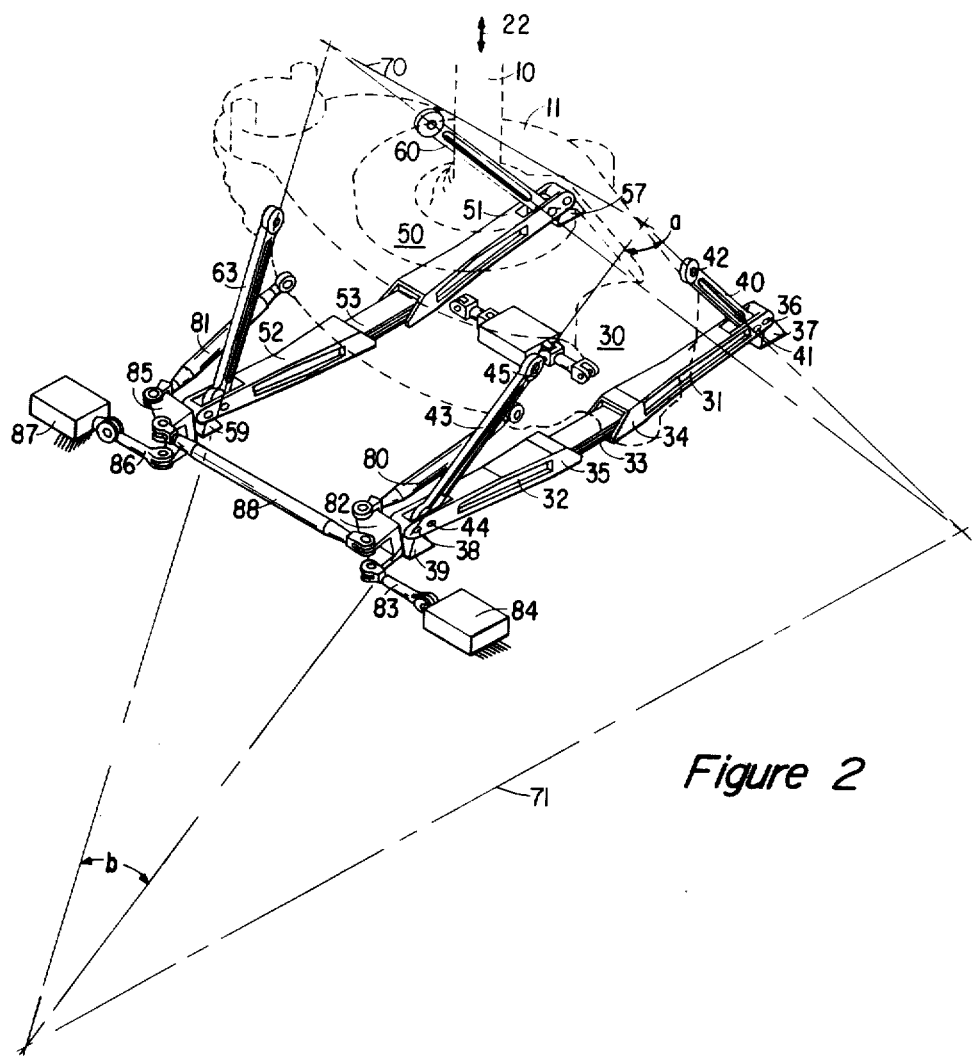
FIG. 2 illustrates one embodiment of the present invention.

Referring now to FIG. 2, pylon 10 and transmission 11 are shown in dotted configuration. The coupling between transmission 11 and fuselage is by way of a pair of compound beams. The first beam 30 comprises rigid end members 31 and 32 interconnected by a more flexible center beam 33. Center beam 33 is nested in cup-like ends 34 and 35 of beams 31 and 32. The extremity of beam 31 opposite beam 33 is connected by pin 36 to a mounting fixture 37 which is secured to the fuselage. The end of beam 32 opposite beam 33 is connected by way of pin 38 to a fixture 39 which is secured to or forms a part of the fuselage. Rigid support link 40 extends from pin 41 in beam 31 to a pin 42 that is secured to the transmission 11. A link 43 similarly is coupled between pin 44 on beam 32 and is secured by a pin 45 to transmission 11.

In a similar manner, a second beam 50 comprises rigid elements 51 and 52 with a soft beam 53 coupling the end thereof together and is coupled to fixtures 57 and 59. Rigid links 60 and 63 serve to couple beams 51 and 52, respectively, to transmission 11.

Links 40 and 43 are canted with the upper ends extending towards each other so that the intersection of the centers thereof is along a line 70. Similarly, the center line of links 60 and 63 intersect at line 70. Line 70 passes through the center of percussion of the pylon 10, thereby minimizing pitching motions that otherwise would be induced into the fuselage if line 70 were displaced from the center of percussion of the pylon.

The members 40 and 60 are canted one with respect to the other such that the center lines thereof intersect below the assembly at a line 71. Similarly, arms 43 and 63 intersect on line 71. Line 70 extends athwart ship. Line 71 extends longitudinally of the aircraft. Line 71 passes through the center of gravity of the aircraft. Thus, the nodalizing beams 30 and 50 permit a nodalized mount of the pylon 10 and transmission 11 while maintaining the advantages involved in a focused rotor system.

In this embodiment of the invention, a pair of torque links 80 and 81 are connected by suitable pins to lower portions of the transmission 11 and extend generally in a plane perpendicular to the axis of the pylon 10. Link 80 is connected to a toggle member 82 which in turn is connected by link 83 to an elastomeric mount 84 which is secured to the fuselage. In a similar manner, link 81 is connected to a toggle member 85 which in turn is coupled by link 86 to an elastomeric fuselage member 87. Toggle members 82 and 85 are then interconnected by link 88. Torques in the horizontal plane developed in pylon 10 may, by linkages 80–88, be transmitted to the fuselage without modifying the nodalized operation involved in the beams 30 and 50. The vertical movement represented by arrow 22 present in the transmission 11 are imposed on beams 30 and 50 by linkages 40, 43, 60 and 63. Because the intermediate beams 33 and 53 bend, the points, such as point 36, are at vibration nodes and thus little if any of the motion represented by arrow 22 is transmitted to the fuselage.

FIG. 3

Figure 3:
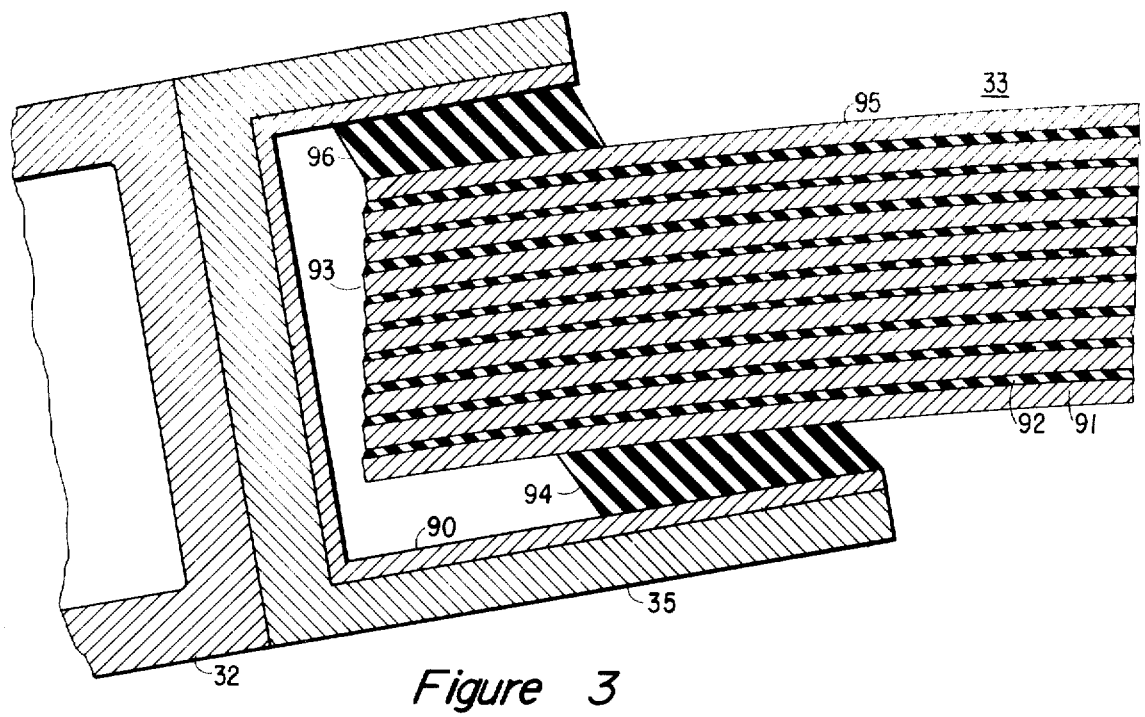
FIG. 3 is an enlarged view of a portion of a beam of FIG. 2.

Structure for the beam 33 in a preferred embodiment of the invention is illustrated in detail in FIG. 3. In this embodiment, the cup 35 at the end of beam 32 serves to nest one end of the beam 33. The cup 35 is provided with a rectangular metal liner 90. The beam 33 is comprised of ten metal layers, such as layer 91. Bonded between each adjacent surface of the layers 91 is a layer of an elastomeric material 92. Thus, the beam 33 is a bonded elastomeric beam with the layers 92 interspersed between each of the adjacent metallic layers 91. This permits the beam to bend without frictional displacement of one metal surface on another. In the bent configuration, the end 93 is stepped to reflect the shear forces to the rubber layers 92.

The lower metal layer 91 is bonded to the upper surface of a pillow block 94 of elastomeric material. The lower surface of pillow block 94 is bonded to the inner surface of sup 90. The upper metal plate 95 of beam 33 is bonded to the lower surface of an upper similar pillow block 96. The upper surface of block 96 is of material such as sold under the trademark TEFLON and is not bonded to cup 90. By this means, the end 93 of beam 33 is securely attached to the bottom of cup 90 but is permitted substantial relative motion in response to bending forces at the top of cup 90.

In one embodiment of the invention, the beam members 31 and 32 were 16.8 inches long. The beam 33 was 5 inches long. The beam 33 was made of bars 91, 95 each 0.1 inch in thickness, 2.0 inches in width and 10 inches long (seven bars).

The rubber layer sandwiched between the metal strips 90, 95 was of rubber and was in the unstressed condition of 0.03 inch thickness. The compound beam comprising the elements 30, 32 and 33 were then driven at pins 41 and 44 by links 40 and 43 at points which were 34 inches apart. The spacing between pins 38 and 36 of FIG. 2 was then 38.5 inches. The angle of FIG. 2 was 130°. The angle $b$, FIG. 2, was <30°.

FIG. 4

Figure 4:
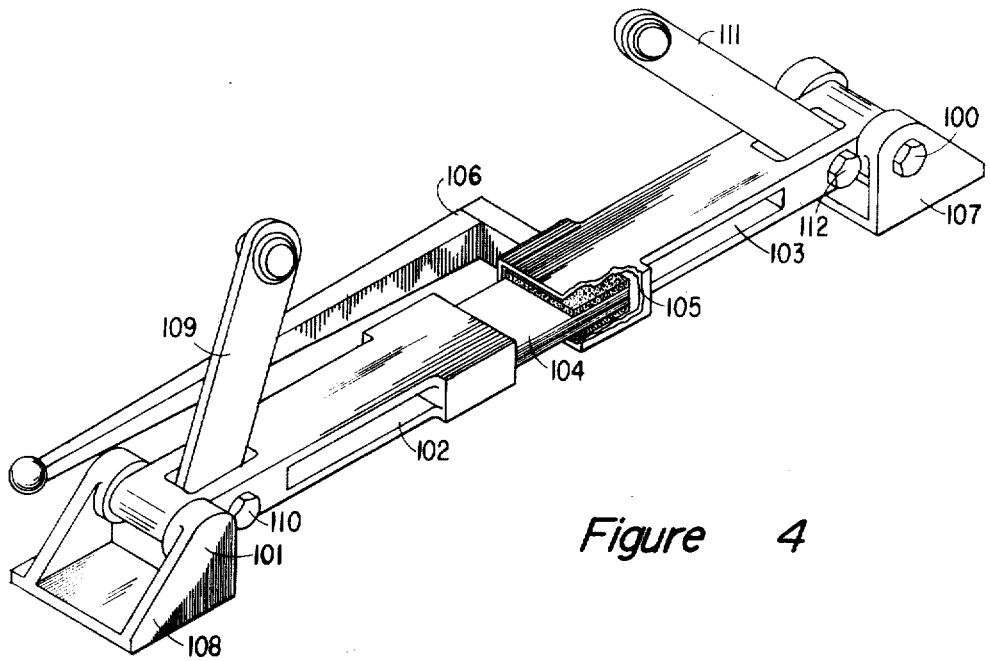
FIG. 4 is a modification of one of the beams of FIG. 2.

FIG. 4 illustrates a modification of the invention in which the beam was provided with loading to change the natural frequency thereof to further minimize the spacing between nodal points 100 and 101. The beam is comprised of the rigid end members 102 and 103 interconnected by a more flexible center beam 104. The cutaway portion of beam 103 shows the nesting of center beam 104 in the cup-like end 105 of beam 103. An arm 106 is rigidly attached to beam 103 near cup 105. A load applied by arm 106 changes the frequency of beam 102, 104, 105 which permits reduction in the distance between nodal points 100 and 101. The extremity of beam 103 opposite beam 102 is connected by pin 100 to a mounting fixture 107 which is secured to the fuselage. The end of beam 102 opposite beam 103 is connected by way of pin 101 to a fixture 108 which is secured to or forms part of the fuselage. The rigid support link 109 extends from pin 110 in beam 102. A link 111 is similarly attached to beam 103 by pin 112.

FIG. 5

Figure 5:
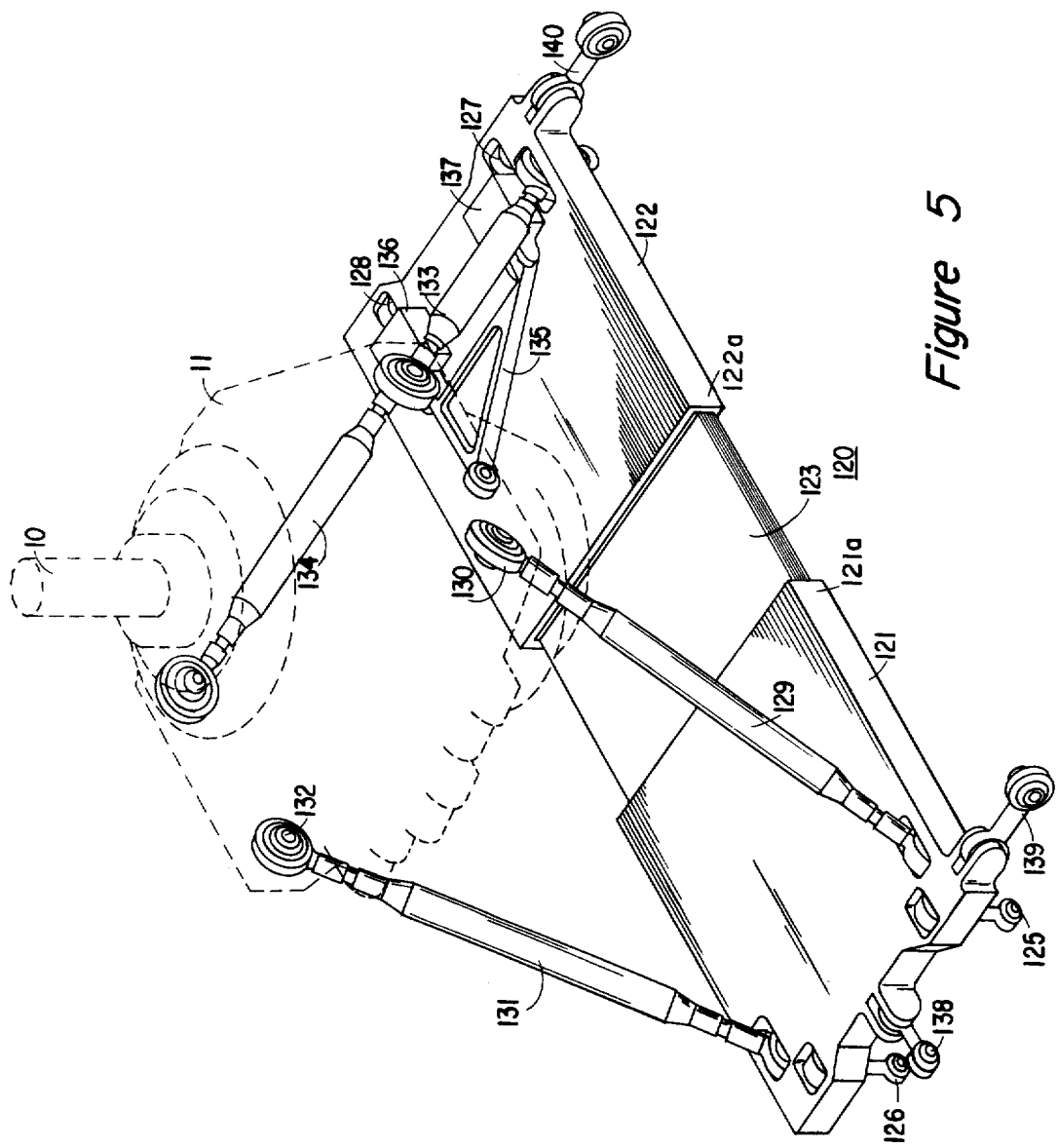
FIG. 5 illustrates application of the present invention to a single beam nodalized unit.

FIG. 5 illustrates application of the present invention to a single beam nodalized unit. Pylon 10 and transmission 11 are shown in dotted configuration. The coupling between transmission 11 and the fuselage is by way of a single compound beam 120. The beam comprises rigid end members 121 and 122 interconnected by a more flexible center beam 123. Center beam 123 is nested in cup-like ends 121a and 122a of beams 121 and 122. The extremity of beam 121 opposite beam 122 is connected by suitable pins to links 125 and 126 which are secured to the fuselage. Similarly, the extremity of beam 122 opposite beam 121 is connected by suitable pins to links 127 and 128 which are secured to the fuselage. Rigid support link 129 is connected by a suitable pin to beam 121 and extends to a pin 130 that is secured to transmission 11. A link 131 is similarly attached to beam 121 by a suitable pin and extends to pin 132 which is secured to transmission 11. In a similar manner, rigid links 133 and 134 serve to couple beam 122 to transmission 11.

In this embodiment of the invention, a single torque link 135 is connected by suitable pin to the lower portion of the transmission 11. Link 135 is connected to elastomeric mounts 136 and 137 which in turn are secured to beam 122. The extremity of beam 121 opposite beam 122 is connected by suitable pins to rigid links 138 and 139 which are in turn secured to the fuselage. The extremity of beam 122 opposite beam 121 is connected by a suitable pin to rigid link 140 which is secured to the fuselage. Torques in the horizontal plane developed in pylon 10 may, by linkages 138 – 140, be transmitted to the fuselage without modifying the nodalized operation involved in beam 120.

Thus, in accordance with the invention, a helicopter, having a lift unit including a multiblade helicopter main rotor system and a nodalized module including a beam driven in response to blade developed vertical forces, has a fuselage unit connected to the beam only as vibration nodal points along the beam. The coupling between the lift unit and the fuselage comprises two rigid arms which form the beam and which extend toward one another from the nodal points. A multilayered flexible beam section interconnects the arms to accommodate beam bending in the flexible section. A rigid member is attached to each of the arms at drive points intermediate the nodal points in supporting relation from the lift unit.

In a preferred form, the beam has an elastomeric multi lamina middle section imbedding a plurality of parallel longitudinally extending spring plates for control of the spring constant of the beam.

Having described the invention in connection with certain specific embodiments thereof, it is to be understood that further modifications may now suggest themselves to those skilled in the art and it is intended to cover such modifiations as fall within the scope of the appended claims.

I claim:

1. A structure for carrying a load from a super positioned vibratory support comprising:
   a. at least one nodalized beam supporting said load from nodal points on said beam and comprising two rigid arms extending toward one another from said nodal points with a multilayered flexible beam section interconnecting the confronting ends of said arms, and
   b. two members extending from said support, each of said members being connected, respectively, to one of said arms at a drive point, said drive points being located intermediate said nodal points on said beam.

2. The combination set forth in claim 1 wherein said flexible beam section comprises a plurality of elastomeric layers interposed between and bonded to a plurality of adjacent metal spring plates for control of the spring constant of said beam.

3. The combination set forth in claim 2 wherein each of said two rigid arms is subtended by a cup for housing an end portion of said flexible beam section.

4. The combination set forth in claim 3, wherein one outer member of said plurality of spring plates in bonded to elastomeric pillow blocks movably seated within each said cup, and a second outer member of said plurality of spring plates is bonded to elastomeric pillow blocks which in turn are bonded to an inner lip of each said cup.

5. The combination set forth in claim 1 wherein a load is rigidly attached to one of said two rigid arms to change the natural frequency of said beam and permit a reduction of distance between nodal points of said beam.

6. The combination of claim 1 wherein said members are rigid links coupled between said support and said arms.

7. The combination of claim 6 wherein said links are coupled to said support and said arms by pins whereby relative rotation is permitted between said links, said support and said arms.

* * * * *